United States Patent
Ashjian et al.

[11] Patent Number: 5,985,804
[45] Date of Patent: Nov. 16, 1999

[54] BIORESISTANT SURFACTANTS AND CUTTING OIL FORMULATIONS

[75] Inventors: Henry Ashjian, East Brunswick; Thomas J. Giacobbe, Skillman, both of N.J.; Frederick C. Loveless, Yardley, Pa.; Carl R. Mackerer, Pennington, N.J.; Norman J. Novick, Holland; Thomas P. O'Brien, Warminster, both of Pa.

[73] Assignee: Mobil Oil Corporation, Fairfax, Va.

[21] Appl. No.: 07/855,127

[22] Filed: Mar. 18, 1992

Related U.S. Application Data

[63] Continuation of application No. 07/612,771, Nov. 6, 1990, abandoned.

[51] Int. Cl.⁶ .................... C10M 173/00; C10M 129/00; C10M 133/16; C10M 145/00
[52] U.S. Cl. .................... 508/287; 508/291; 508/496; 508/497; 508/499; 508/506; 508/512; 508/513; 508/527; 508/551
[58] Field of Search .................... 252/49.3, 49.8, 252/42, 52 R, 56 D, 49.6, 51.5 A, 40.5, 34.7, 33.6; 560/190, 204; 508/287, 291, 496, 497, 499, 506, 512, 513, 527, 551

[56] References Cited

U.S. PATENT DOCUMENTS

| | | | |
|---|---|---|---|
| 2,741,597 | 4/1956 | Osterbout | 252/56 |
| 4,100,083 | 7/1978 | Murphy et al. | 252/34 |
| 4,107,115 | 8/1978 | Foulks, Jr. | 252/35 |
| 4,239,635 | 12/1980 | Rieder | 252/49.3 |
| 4,263,015 | 4/1981 | Sung et al. | 252/51.5 A |
| 4,283,296 | 8/1981 | Nebzydoski et al. | 252/565 |
| 4,368,133 | 1/1983 | Forsberg | 252/75 |
| 4,409,113 | 10/1983 | Bertell | 252/49.5 |
| 4,448,703 | 5/1984 | Forsberg | 252/75 |
| 4,661,275 | 4/1987 | Forsberg et al. | 252/49.3 |
| 4,664,826 | 5/1987 | Gutierrez et al. | 252/392 |
| 4,664,834 | 5/1987 | Forsberg | 252/49.3 |
| 4,670,168 | 6/1987 | Laemmle et al. | 252/49.3 |
| 4,689,166 | 8/1987 | Dohner | 252/52 A |
| 4,705,642 | 11/1987 | Sung et al. | 252/392 |
| 4,749,500 | 6/1988 | Forsberg et al. | 252/49.3 |
| 4,767,554 | 8/1988 | Malito | 252/49.5 |
| 4,770,803 | 9/1988 | Forsberg | 252/75 |
| 4,778,614 | 10/1988 | Rawlinson et al. | 252/49.5 |
| 4,781,848 | 11/1988 | Biresaw et al. | 252/49.5 |
| 4,839,068 | 6/1989 | Lange | 252/33.6 |
| 4,956,110 | 9/1990 | Lenack et al. | 252/49.5 |

OTHER PUBLICATIONS

U.S. Patent Appln. S.N. 07/612,771, Abandoned.

*Primary Examiner*—Margaret Medley
*Attorney, Agent, or Firm*—Malcolm D. Keen

[57] ABSTRACT

It is disclosed that succinic acid and its derivatives that contain a branched aliphatic group on the 2 or alpha position of succinic acid form surfactants that exhibit a high order of or bioresistance to bacteriological degradation. Further, it has been discovered that these novel surfactants can be employed to prepare novel oil-in-water emulsions with lube oils such as mineral oil that are effective as cutting fluids for machining operations but provide an improved resistance to biodegradation to the cutting oil so formulated, without resorting to the inclusion of conventional biocides in the formulation. It has also been discovered that the bioresistance of the cutting fluid emulsion formulation can be further enhanced by using a branched aliphatic hydrocarbon oligomer or polymer as the lubricative component in the formulation. Cutting fluid emulsions so formulated are effective fluids in prolonging tool life and facilitating machining operations.

26 Claims, 3 Drawing Sheets

BIORESISTANT SURFACTANTS AND CUTTING OIL FORMULATIONS

This is a continuation of application Ser. No. 07/612,771 filed on Nov. 6, 1990, now abandoned.

BACKGROUND OF THE INVENTION

Modern metal working and forming processes normally require the use of cutting fluids whose function is to facilitate the machining operations by cooling and lubricating the workpiece. In machining operations where only lubrication is necessary, lube oils are used. When lubrication and cooling are required, lube oil-in-water emulsions are used. The cooling function is accomplished by the ability of the fluid to carry off the heat generated by the frictional contact between the tool and the workpiece. Cooling aids tool life, preserves tool hardness and helps to maintain the dimensions of the machined parts. The cutting fluid also serves to carry away debris from the work area. Both straight lube oil cutting fluids and lube oil-in-water emulsions conventionally contain additives such as defoamants, corrosion inhibitors, extreme pressure active material, metal cleaners, and the like.

In addition to the primary functions of cooling and lubricating, cutting fluids should be non-corrosive, chemically stable, non-toxic and dermatologically safe. Moreover, the cutting fluid composition itself should have some stability against microorganisms. Bacteria and fungi frequently spoil soluble cutting fluids, especially oil in water emulsions, during machining operations. The cutting environment, which contains warm water and an available carbon source, provides a good medium for microorganism growth. Spoilage often manifests itself first as a foul smell. Furthermore, spoilage can cause color change, emulsion break, acidity increase, and sludge formation. Any of these signal a need to change the cutting fluid. Under severe conditions of use, changes due to biological fouling can be required every few days.

To remedy this situation it is conventional in the art to add various biocides to cutting fluid compositions in order to control microbial growth and thus extend fluid life. However, biocides present their own problems. Some cause contact dermatitis, and others cause allergic dermatitis. Still others, through in situ modification, become suspect carcinogens. Government regulations and worker concern about biocide exposure further inhibit their use. Even in situations where the added biocides have no known adverse reaction to humans, biological fouling of the cutting fluid can still occur within a short time and lead to the serious problems of offensive odor, filter plugging, eventual loss of lubricative properties and corrosion of parts and machinery caused by acidic by-products generated by the microorganisms. Furthermore, if the cutting fluid is employed in the form of a stable emulsion with water, biological fouling can lead to the breaking of the emulsion.

Biocides also seriously complicate the problem of the disposal of waste cutting fluid emulsions. For disposal, the emulsion is broken, usually by acidification. The aqueous phase is separated and preferably discharged into a local river. However, biocides in the emulsion can be carried into the aqueous phase when the emulsion is broken, rendering that phase toxic to marine life and requiring costly pretreatment before discharge to the environment.

In view of the foregoing problems associated with the use of biocides in cutting fluids, an ideal cutting fluid would thus contain no biocide while exhibiting bioresistance for prolonged periods of use.

Soluble cutting oils, such as those exemplified by the current industrial standards, are known to degrade biologically, suggesting that oleic acid or other fatty acids, acting as a surfactant in these fluids, contributes most to spoilage by supplying food for microbial growth. As surfactants, sulfonates can replace carboxylates. However, sulfate-reducing bacteria convert sulfonates to hydrogen sulfide, a well known malodorant. In addition, the typical cutting fluid basestock—namely, mineral oil, contains normal paraffins which can also provide food to microorganisms. It is well known that normal paraffinic moieties are biologically degraded at a rate faster than paraffinic moieties containing branching or tertiary carbon atoms.

The observation of the difference in biodegradability of straight chain versus branched aliphatic hydrocarbons has been applied in U.S. patent application Ser. No. 07/441,795, filed Nov. 27, 1989 now and incorporated herein by reference. The discovery of bioresistant surfactants based on isohexadecanoic acid and isoeicosanoic acid which have a branched carbon skeleton is reported therein. Cutting oil emulsion formulations prepared using these acids as surfactant show a high resistance to biodegradation, without incorporating biocides in the formulation. However, the branched carboxylic acids disclosed in the cited application as bioresistant surfactants are relatively expensive and their use compromises the utility of cutting oil formulations prepared therefrom.

It is an objective of the present invention to provide novel bioresistant surfactants derived from relatively inexpensive aliphatic carboxylic acids having a branched carbon chain.

Another object of the present invention is to provide cutting oil formulations using these novel bioresistant surfactants.

A further objective of the present invention is to provide cutting oil formulations incorporating the above novel surfactants together with bioresistant, branch chain lubricants.

Yet another object of the present invention is to provide the foregoing novel cutting oil formulations containing non-biocidal additives to enhance their utility and compatibility with environmental biosystems.

SUMMARY OF THE INVENTION

It has been discovered that succinic acid and its derivatives that contain a branched aliphatic group on the 2 or alpha position of succinic acid form surfactants that exhibit a high order of resistance, or bioresistance, to bacteriological degradation, or biodegradation. Further, it has been discovered that these novel surfactants can be employed to prepare novel oil-in-water emulsions with lube oils such as mineral oil that are effective as cutting fluids for machining operations but provide an improved resistance to biodegradation to the cutting oil so formulated, without resorting to the inclusion of conventional biocides in the formulation. It has also been discovered that the bioresistance of the cutting fluid emulsion formulation can be further enhanced by using a branched aliphatic hydrocarbon oligomer or polymer as the lubricative component in the formulation. Cutting fluid emulsions so formulated are at least as effective as prior art fluids in prolonging tool life and facilitating machining operations. The absence of biocides in the formulations of the invention also facilitates the disposal of the aqueous portion of spent cutting fluid emulsions.

More particularly, a bioresistant surfactant composition has been discovered comprising succinic acid, or derivatives thereof, containing branched aliphatic substituent groups on the alpha carbon of said succinic acid, said substituent containing at least nine carbon atoms, at least three of which are tertiary carbon atoms. The composition has the structure:

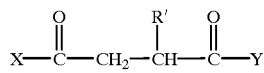

wherein X and Y are alike or different and taken from the group consisting of —OH, —OK, —ONa, —OLi, —ONH$_4$, —ONH$_3$Z, —ONH$_2$Z$_2$, or ONHZ$_3$ where Z is alkyl or hydroxy alkyl, also wherein X and/or Y are —OR", —NH$_2$, —NHR" or NR$_2$", where R" is C$_1$–C$_{20}$ alkoxy or alkenoxy or polyethoxy or polyisopropoxy; and where R' comprises C$_9$–C$_{150}$ alkyl or alkenyl hydrocarbon containing at least 3 tertiary carbon atoms.

The bioresistant cutting fluid composition of the invention comprises the aforestated bioresistant surfactant and a lubricative basestock material including polymers and copolymers of ethylene, propylene, butene, isobutene, butadiene, isoprene, or other alpha-olefin and mineral oil.

DETAIL DESCRIPTION OF THE INVENTION

Figure 1:
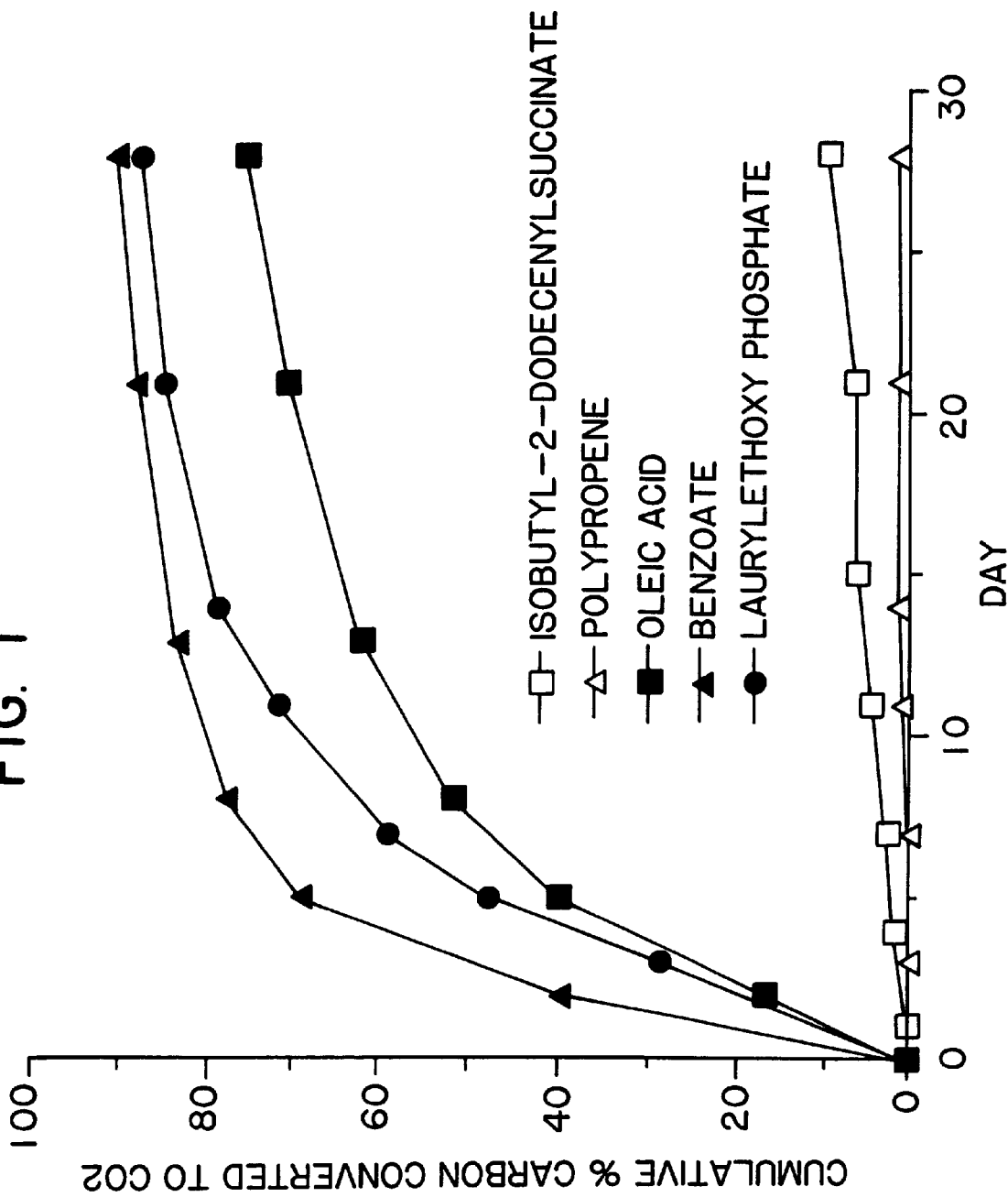
FIG. 1 is a graph comparing the biodegradability of cutting fluid components in comparison to a preferred surfactant of the invention, based on the microbial conversion of carbon to carbon dioxide.

The novel bioresistant surfactants of t he present invention are prepared in a series of reactions starting with the well-known "Ene" reaction by reacting olefinic materials containing allylic unsaturation and enophiles thermally or in contact with catalyst to form the unsaturated adduct. The "Ene" reaction is described in "Accounts of Chemical Research", 1980,13,426–432 by B. B. Snider, incorporated herein by reference in its entirety. Upon completion of the "Ene" reaction and formation of the adduct, the unsaturated adduct can be used directly as a bioresistant surfactant when the enophile polar moiety is sufficiently hydrophilic; or the polar group of the enophile moiety can be further reacted as appropriate to produce bioresistant soaps. The olefinic unsaturation of the adduct can also be hydrogenated by means well known in the art t o produce bioresistant surfactants of the invention. The preferred adduct (I) and the saturated adduct (II) have the structure:

(I)

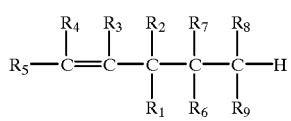

where, in (I) and (II), R$_1$ through R$_5$ may be hydrogen, alkyl or alkenyl and the sum of carbon atoms in all R$_1$ through R$_5$ groups totals at least 9 and contains at least three tertiary carbon atoms; where at least one of R$_8$ and R$_9$ is an electronegative group with the remaining groups of R$_6$ through R$_9$ being an electronegative group or hydrogen, alkyl, alkenyl, aryl or aralkyl. Groups R$^1$ through R$^5$ may further contains O, N or S comprising ether, carbonyl, amine, imine, amide, sulfide, disulfide, mercapto or thio groups.

(II)

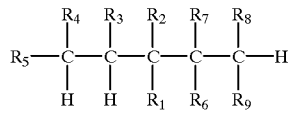

The term tertiary carbon atom as used herein refers to a carbon atom containing three alkyl or alkenyl groups with the fourth valence satisfied by hydrogen. A preferred tertiary carbon atom is one containing a methyl group. Such tertiary carbon atoms comprise the branching referred to in the invention that renders the surfactants of the invention bioresistant when incorporated into the surfactant in sufficient number. Where the term branching is used herein in reference to the bioresistant surfactants of the invention an aliphatic chain containing at least three tertiary carbon atoms is intended and defines that branching. The term bioresistant refers to an ability to withstand degradation by various microorganisms.

The enophiles useful in the present invention include all those having the structure:

(III)

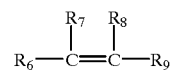

where at least one of R$_6$, R$_7$, R$_8$ and R$_9$ is an electronegative group and the remaining groups are hydrogen, alkyl, alkenyl, aryl or aralkyl. The electronegative groups useful in the enophiles of structure (III) include those where R$_7$ and R$_8$ comprise the group

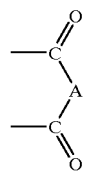

where A is O, NH, NR$_i$ where R$_i$ is alkyl, alkenyl or alkoxy; or where at least one of R$_6$, R$_7$, R$_8$, R$_9$ comprises

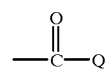

where Q is H, OH, OR$_i$, NH$_2$, NHR$_i$, N(R$_i$)$_2$ where R$_i$ is alkyl, alkenyl or alkoxy; and groups such as CN. Enophiles of particular use in the instant invention include maleic anhydride, maleimide, acrylonitrile, ethylacrylate, acrylamide, acrolein, methacrylic acid, ethyl vinyl carbonate, 2-hydroxyethyl acrylate and the like.

The olefins useful in the present invention to prepare the adduct depicted in structures (I) or (II) when reacted with the foregoing enophiles comprise non-straight chain aliphatic compounds having between 9 and 150 carbon atoms. These hydrocarbyl components of the adducts provide the necessary oleophilic property to the surfactant produced therefrom while their branched or non-straight chain structure lends bioresistivity thereto. Any olefin containing allylic unsaturation and having at least 9 carbon atoms including at least three tertiary carbon atoms may be used to prepare the adduct. Such olefins are commercially available and conveniently and inexpensively prepared from refinery feedstreams such as isobutene and propene by oligomerization or polymerization using processes well known to those skilled in the art. Useful olefins may also be prepared by cracking the higher molecular weight fractions of refinery feedstreams. Optionally, higher molecular weight olefins, such as 1-decene, are oligomerized with Lewis acid catalyst to provide branched oligomers which can be utilized in the "Ene" reaction to produce bioresistant surfactants. Preferably, the hydrocarbyl substituent in the adduct derived from the foregoing branched olefins has the recurring structure comprising [—CH$_2$—CRH—]n, wherein R comprises C$_1$–C$_{20}$ alkyl or alkenyl and n is an integer from 3 to 50. A preferred substituent comprises propenyl oligomer. Another preferred substituent comprises isobutenyl oligomer. A particularly preferred substituent comprises propenyl tetramer.

While the bioresistant adducts prepared via the "Ene" reaction using the olefins and enophiles described above can, of themselves, be employed as surfactants, it is preferably in the present invention to convert these materials to anionic surfactants. This can be achieved by converting the adduct to the carboxylate form using means and methods well known to those skilled in the organic chemical arts. For instance, where the adduct contains ester, amide, imide or nitrile groups they can be readily hydrolyzed to the corresponding carboxylic acid which is then preferably converted to an ammonia, amine or alkali or alkaline earth metal salt. Anhydrides, such as maleic anhydride, react readily with active hydrogen compounds such as alkanol to form the corresponding half ester of succinic acid and further converted to a salt.

The process of the present invention is illustrated in the following reaction sequence wherein propene tetramer having at least three tertiary carbon atoms, maleic anhydride and isobutanol are converted to a particularly preferred bioresistant anionic surfactant composition, potassium monoisobutyl-2-dodecenyl succinate (VII), referred to herein as MIDS.

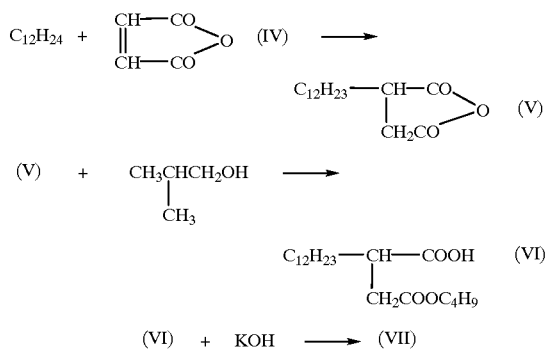

The reaction of maleic anhydride with olefins is generally known in the art as succinic addition or succinic adduction. (V), a product representative of the reaction, is referred to in the art as the succinic adduct.

The preferred bioresistant succinate surfactants of the invention have the following composition and structure:

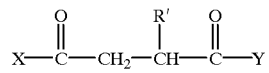

(VIII)

wherein X and Y are alike or different and taken from the group consisting of —OH, —OK, —ONa, —OLi, —ONH$_4$, —ONH$_3$Z, —ONH$_2$Z$_2$, or ONHZ$_3$ where Z is alkyl or hydroxy alkyl, —OR", —NH$_2$, —NHR" or NR$_2$", where R" is C$_1$–C$_{20}$ alkoxy or alkenoxy or polyethoxy or polyisopropoxy; and where R' comprises C$_9$–C$_{150}$ alkyl or alkenyl hydrocarbon containing at least 3 tertiary carbon atoms. In (VIII) alternating carbon atoms of R' comprise tertiary carbon atoms. Preferably, one of X or Y in (VIII) is —OK, —ONa or —OLi while the remaining X or Y is —OR".

The foregoing carboxylic acid compounds can be present in the form of an amine soap, as well as alkali metal soap or an alkaline earth metal soap so long as solubility in the cutting oil concentrate and in the final emulsion is maintained; that is, any of these materials may be used to form the soap so long as no precipitates are formed. The amine soap is formed, for example, by reaction of the carboxylic acids with an alkanolamine, such as triethanolamine. This alkanolamine may constitute an additive in forming the actual cutting fluid composition, thus forming the soap in situ and conveniently eliminating the need for separate reactions.

The bioresistant cutting fluid compositions of the present invention are most essentially comprised of the surfactant of the invention and a lubricating basestock material, such as mineral oil, which of course is the industry standard and serves well as a benchmark in evaluating various cutting fluids. While mineral oil (for example, solvent refined neutral paraffinic oil) may be used in the practice of the invention it is preferred to use synthetic oils, such as for example polydecene, which recent environmental studies have shown as degrading biologically more slowly than mineral oil. This slower degradation, of course, translates into even greater cutting oil stability.

Most preferably, the lubricative basestocks used in formulating the cutting fluid are comprised of components which themselves are branched, i.e. have a carbon skeleton profile which is not straight chain, much like that of the surfactants of the invention. This branching lends further bioresistance to the final product, thus enhancing the useful life even more. An example of a basestock having a highly branched carbon profile is polypropene, which, in theory, contains a methyl group on every second carbon in the backbone. Other lubricative basestocks, useful in the present invention, having the preferred branched skeleton include copolymers of propylene and butene; polybutene, polyisobutylene; and liquid ethylene-propylene copolymer. Hydrogenated liquid polybutadiene and polyisoprene are also preferred provided they possess the proper microstructure; that is, that they are polymerized in other than a head-to-tail fashion so as to provide a branched polymer structure. Any other alpha-olefins may be effectively utilized as a basestock material especially if the carbon profile is branched. This branched structure favorably affects the biodegradation resistance of the formed fluid without affecting the necessary lubricating qualities.

Other known additives may, as a practical matter, be incorporated into the bioresistant cutting fluid composition of the present invention. These may be added, for example, to enhance properties already present in the fluid composition or to provide properties not present in the base stock.

Functionally, such additives may lend increased extreme-pressure activity to the fluid; increase corrosion inhibition; metal cleaning; friction reduction of the fluid; or may further provide defoamant or biostatic properties to the fluid. Specifically, these additives generally include an organo-phosphate ester, such as an alcohol ethoxyphosphate which is, for example, a fatty alcohol of approximately 5 to 6 mol ethylene oxide esterified to mono- and diesters of phosphoric acid; an alkanolamine, such as triethanolamine; a boric acid ester of an alkanolamine, such as boric acid ester of mono- and tri-ethanolamine; and an acetylenic diol, such as 2,4,7,9-tetramethyl-5-decyne-4,7-diol. Various esters, which increase lubricity, may optionally be used in the formulation.

Besides being a surfactant, phosphorus from the alcohol ethoxyphosphate contributes extreme pressure activity. The borate ester inhibits microorganism growth in addition to its anti-rust and extreme-pressure activity. Table 1 lists without limiting, the various components which may be used to formulate a practical bioresistant cutting fluid composition in accord with the invention. The functionality and commercial source of these components are also listed.

TABLE 1

Cutting Oil Components

| COMPONENTS | SOURCE | FUNCTIONS(S) |
| --- | --- | --- |
| Basestocks | | |
| Mineral Oil | Mobil Oil Corp. | lubricant |
| polydecene (PAO) | Mobil Oil Corp. | lubricant |
| polypropene | Amoco Petroleum Additives Company | lubricant |
| Additives | | |
| alcohol ethoxyphosphate | GAF Corp. | surfactant and extreme pressure (EP) activity |
| reaction product of mono- and tri-ethanol-amine and boric acid | Climax Performance Materials | rust preventer metal cleaner, extreme pressure activity and biostat activity |
| 2,4,7,9-tetramethyl-5-decyne-4,7-diol | Air Products | surfactant and defoamant |
| esters of oxidized petroleum hydrocarbons | Alox Corp. | friction-reducer |

The following Examples are provided to illustrate the preparation of the preferred bioresistant surfactants of the invention.

EXAMPLE 1

Preparation of Monoisobutyl-2-Dodecenyl-Succinate.

A 12 liter flask is fitted with an agitator, thermometer, nitrogen gas inlet, water-jacketed condenser, and heating mantle. It is charged with dodecenylsuccinic anhydride (V) (4795.2 g, 18.0 mole, from Humphrey Chemical Co. comprising the adduct of propene tetramer and maleic anhydride) and isobutanol (1334.2 g (18.0 mole) and purged with nitrogen gas. Over one hour, the solution is heated from room temperature to 150° C. where it is maintained for an additional 2.25 hr. An infrared spectrum shows the product with peaks at 3400–2400 cm-1 (acid O—H), 1739 cm-1 (ester C=O), and 1708 cm-s (acid C=)). The spectrum also shows a trace of starting anhydride (peaks at 1785 and 1865 cm-1). The product is a clear, pale yellow liquid with total acid number of 166.5 mg KOH/100 g (ASTM method D-974). Its viscosity is 580 cSt and 17.6 cSt at 40° C. and 100° C. respectively.

EXAMPLE 2

Preparation of Mono-(N,N-Diethylethanolamine)-2-Dodecenyl-Succinate N,N-Diethylethanolammonium Salt The title compound is prepared following the above procedure except N,N-diethylethanolamine is substituted for isobutanol. The resulting acid is neutralized with N,N-diethylethanolamine to generate the acid's ammonium salt, a clear tan liquid with a total acid number of 111.5 mg KOH/100 g. Its viscosity is 647 cSt and 26 cSt at 40° C. and 100° C. respectively. An infrared spectrum shows peaks at 3500–2300 $cm_{-1}$ (O—H, N—H), 1735 $cm_{-1}$ (ester C=O), and 1576 $cm_{-1}$ (COO anion).

EXAMPLE 3

Preparation of Mono-Triethanolamine-2-Dodecenyl-Succinate.

The title compound is prepared following the above procedure except triethanolamine is substituted for isobutanol. The product is a clear, light tan, very viscous liquid with total acid number of 144.3 mg KOH/100 g (ASTM method D-974), and a total base number of 125. Viscosity at 100° C. is 2263 cSt. The infrared spectrum showed peaks at 3300–2500 cm-1 (acid O—H), 1732 cm-1 (esterC=O), and 1712 cm-s (acid C=O).

EXAMPLE 4

Preparation of Mono-N,N-Diethyl-2-Dodecenyl-Succinamide.

The title compound is prepared following the above procedure except diethylamine is substituted for isobutanol. The product is a clear, light tan liquid with total acid number of 169 mg KOH/100 g (ASTM method D-974), and a total base number of 17.5. Viscosity at 100° C. was 117 cSt. The infrared spectrum showed peaks at 3600–2100 cm-1 (acid O—H), and 1732 cm-1 (amide C=O).

Table II lists other bioresistant surfactants of the instant invention based on dodecyl succinic acid and some physical properties of these surfactants.

TABLE II

SURFACTANTS BASED ON DODECENYL-SUCCINIC ACID $$\text{C12H23}-\underset{\underset{\text{CH2}-\text{COR}}{|}}{\text{CH}}-\text{COO}^-\text{X}^+ \quad + \quad \text{C12H23}-\underset{\underset{\text{CH2}-\text{COO}^-\text{X}^+}{|}}{\text{CH}}-\text{COR}$$

| R | X | (Designation); Properties |
|---|---|---|
| —O—CH2CH(CH3)CH3 | H | room temp liquid<br>40 C. viscosity: 580 cSt<br>100° C. viscosity: 17.6 cSt<br>total acid No. (D-974):<br>166.5 mg KOH/100 g<br>IR:<br>3400–2400 cm-1 (COO—H)<br>1739 cm-1 (ester CO)<br>1708 cm-1 (acid CO) |
| —O—CH2CH(CH3)CH3 | K+ | generated in situ by neutralizing acid with KOH |
| —O—CH2CH(CH3)CH3 | +HN(C2H5OH)3 | generated in situ by neutralizing acid with triethanolamine |
| —O—CH2CH2N(C2H5)2 | +HOC2H5N(C2H5)2<br>H | room temp. liquid<br>40 C. viscosity: 647 cSt<br>100° C. viscosity: 26 cSt<br>total acid No. (D-974):<br>111.5 mg KOH/100 g<br>IR:<br>3500–2300 cm-1<br>(O—H, N—H)<br>1735 cm-1 (ester CO)<br>1576 cm-1 (COO anion) |
| —O—CH2CH2N(C2H5oH)2 | H | very viscous liquid<br>100° C. viscosity 2263 cSt<br>total acid No. (D-974):<br>144.3 mg KOH/100 g<br>IR:<br>3300–2500 cm-1<br>(acid OH)<br>1732 cm-1 (CO ester)<br>1712 cm-1 (CO acid) |
| —N(C2H5)2 | H | viscous liquid<br>100 C viscosity 117 cSt<br>total acid no. (D-974):<br>169 mg KOH/100 g<br>IR:<br>3600–2100 cm-1;<br>peak 3313 cm-1<br>(acid OH)<br>1732 cm-1 (CO amide) |

Cutting oils of the present invention are prepared by blending the bioresistant surfactants with a lubricative material and including additives as appropriate for the application. The cutting oils are initially prepared in concentrated form and subsequently diluted with water to form an emulsion. Example 5 illustrates the preparation of a cutting oil concentrate of the present invention.

EXAMPLE 5

Procedure for Blending MIDS Cutting Oil Concentrate

The ingredients listed blow are blended sequentially (in the order given) while warming to about 50° C.

| Ingredient | Source (product designation) | Weight % |
|---|---|---|
| Polypropene | Amoco Petrol. Addit. Co. (A-9012) | 36.0 |
| Monoisobutyl-2-dodecenyl-succinate | Mobil Chemical Co. | 30.1 |
| Laurylethoxy-phosphate | GAF Corp (Gafac Rd 510) | 10.0 |
| 45% aqueous KOH | | 9.4 |
| 2,4,7,9-tetramethyl-5-decyn-4,7-diol | Air Products (Surfynol 104) | 1.0 |
| Triethanolamine esters of boric acid | Climax Performance Mtls (Actracor T) or Mobil Chemical Co. (MCP 1051) | 10.0 |
| Water | | 2.5 |

-continued

| Ingredient | Source (product designation) | Weight % |
| --- | --- | --- |
| Mono-tolyltriazole-2-dodecenyl-succinamine | Mobil Chemical Co. (MCP 1065) | 1.0 |

This concentrate, a clear yellow liquid, quickly blooms into a stable emulsion when added to lightly agitated water (volume ratios of concentrate to water was 6:100). The amount of water used in forming stable emulsions with the novel cutting fluid compositions depends upon the particular cutting or metal working operation in which the fluid is to be employed; the amount of dilution required for a specific application being readily determined from conventional experience. For example, when drilling operations are performed, lubrication becomes important hence requiring a slightly more concentrated emulsion. Normally, for drilling, the preferred volume ratio of concentrate to water is about 6:100. On the other hand, when grinding operations are performed, the cooling of the work piece becomes important, more so than lubrication, hence a slightly more dilute emulsion may be used. Here a preferred volume ratio of concentrate to water would be about 0.5:100 or about 1:100. In general, the low end of emulsion concentration ratio for practical purposes is about 0.5:100. The upper end, of course, depends on economics and not functionality. Thus in theory, the cutting oils of the present invention could be used in their concentrate form; however, in terms of cost efficiency, the upper limit of volume ratio of concentrate to water is about 10:100. Addition of 1% $MgSO_4$ or mineral acid brakes the emulsion. These are standard industry methods to collect the oil for disposal.

The emulsions prepared from the novel surfactant of the invention have been found to be equivalent to or superior to standard industrial cutting fluids. They show excellent resistance to biodegradation without using biocides in the cutting oil formulation. In particular, the novel surfactants are considerably less expensive than the bioresistant surfactants disclosed in the cited related application Ser. No. 07/441,795.

Emulsion Testing

1) Physical a) Foam formation and hard water stability data are obtained from the same test. A pump circulates the emulsion in a glass battery jar while foam height is periodically measured. height. At the test's end, hard water deposits by filtration are collected. For 6% emulsions (6 volumes of cutting oil concentrate and 100 volumes of water), MIDS gave foam heights comparable to commercial standards (Trimsol and Mobilmet 180). For hard water deposits, MIDS had 1–2 gram per 100 gram of oil concentrate. Commercial defoamants significantly reduced foam from MIDS emulsions.

b) Brass and copper corrosion should be minimal in cutting oil emulsions. Neutralizing 70% of the acidity of MIDS reduced corrosion to 0.3 mil per year. Adding 1 wt % tolyltriazole derivative (MIDS formulation) ended all corrosion at both 6 wt % and 10 wt % emulsions. A 6% emulsion of MIDS did not stain copper metal plaques after 48 hours at either 25° C. or 60° C. Rust protection is essential for a soluble cutting oil. An emulsion of MIDS protected malleable iron at only 3%.

c) MIDS emulsions have been found to reject exogenous oils (for example, hydraulic, gear, and way oils). Machinery surrounding a cutting oil system frequently use these oils. Any leaks from the machinery can add exogenous oils to the system. Thus, rejecting them is especially important with MIDS since it does not contain a biocide.

2) Biological testing a) Biodegradation and Bioresistance

Biodegradation and bioresistance is determined using USEPA-Chemical Fate Test Guidelines, EPA 560/6-82-003, August, 1982, method CG2000; and also using the procedure of counting bacterium colonies on a test plate as described in the referenced related patent application Ser. No. 07/441,795.

Figure 2:
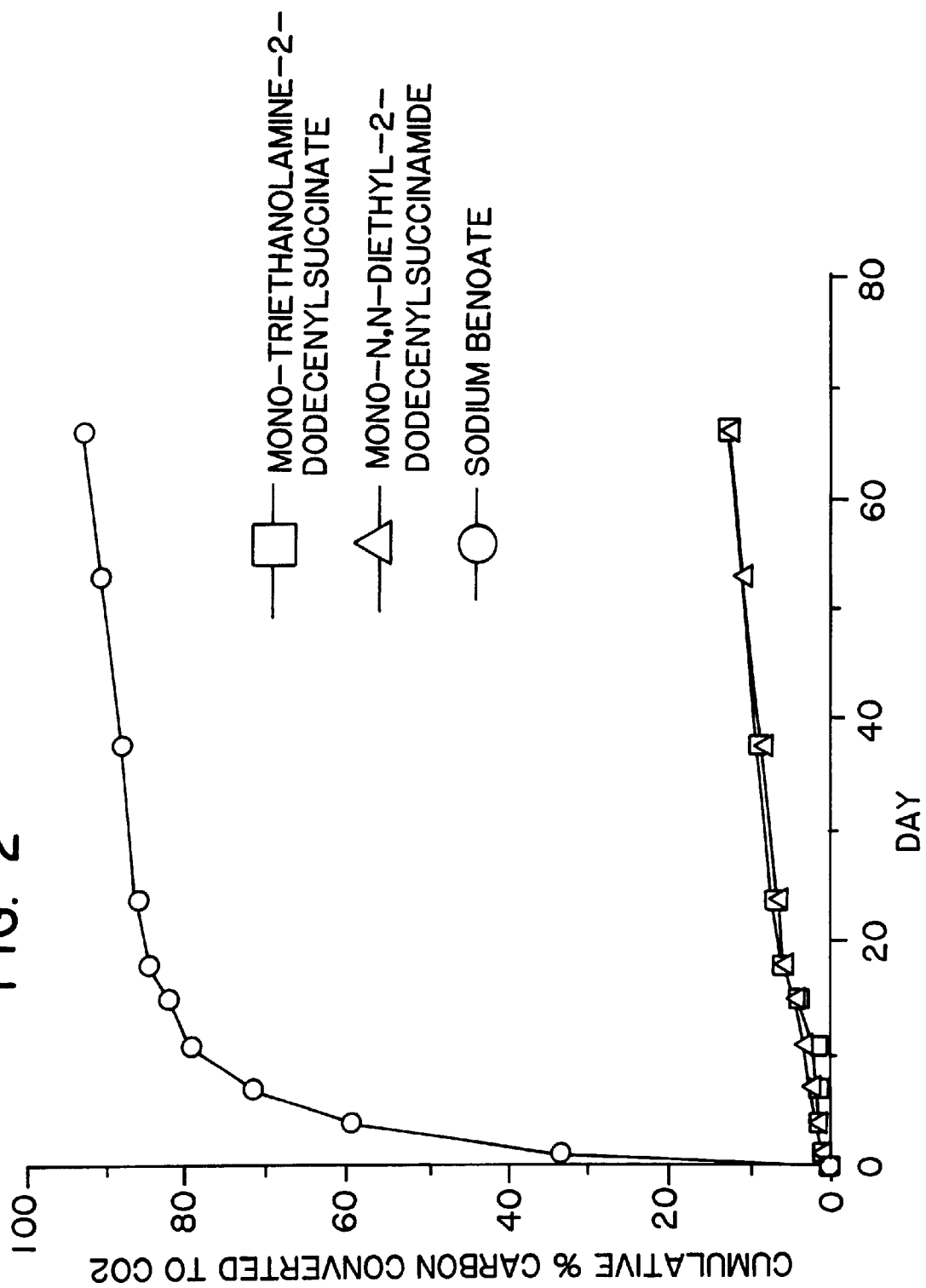
FIG. 2 is a graph comparing the biodegradability of sodium benzoate in comparison to a preferred surfactants of the invention, based on the microbial conversion of carbon to carbon dioxide.

In a 28 day biodegradation test of cutting fluid components, microorganisms converted less than 10% of the carbon in polypropene and monisobutyl-2-dodecenylsuccinate to carbon dioxide. Low biodegradation potential makes a cutting oil bioresistant. Laurylethoxyuphosphate showed about 80% conversion to carbon dioxide. Sodium benzoate and oleic acid were used as positive controls and both degraded extensively. The results are presented in FIG. 1. The biodegradation of mono-triethanolamine-2-dodecenylsuccinate was also measured and mono-N-N-diethyl-2-dodecenylsuccinamide. In both of these compounds, microorganisms also converted less than 10% of the carbon to carbon dioxide. These results are illustrated in FIG. 2.

Figure 3:
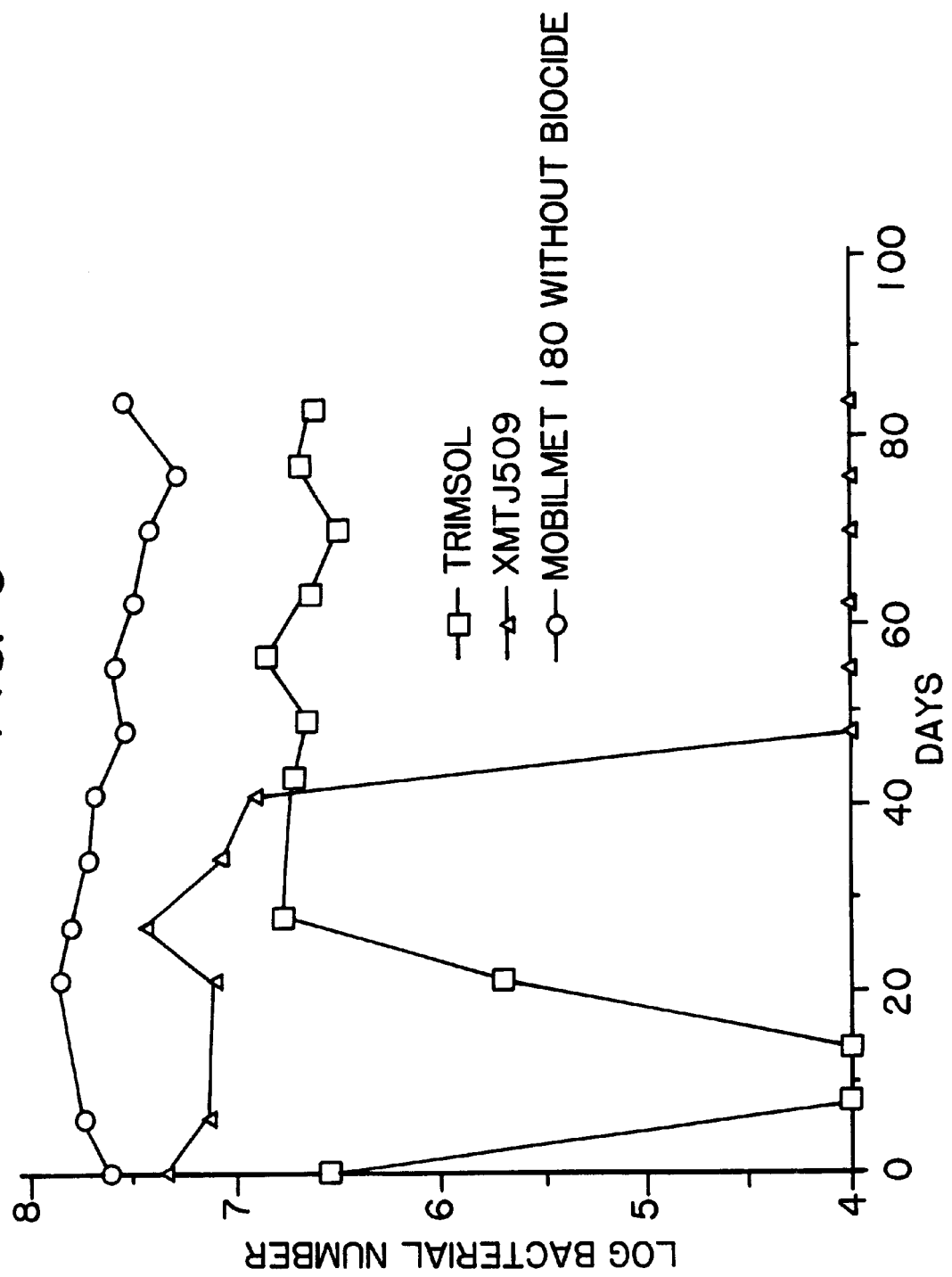
FIG. 3 is a graph presenting the results of a bioresistance test on the novel emulsion of the invention in comparison with commercial industrial cutting fluid emulsions where in the test counts bacteria colonies.

The emulsion bioresistance was also determined by following microorganism concentration with time. In a MIDS emulsion, microbe population fell from $10^7$–$10^8$ to less than $10^4$ per milliliter. This occurred despite weekly inoculation of $10^6$ microbes per milliliter. The bacterial inoculum was a composite of spoiled cutting fluids that came from locations across the U.S. The composite was washed to remove growth media before use. Microbe concentration drop was witnessed after a variable delay, usually 14–50 days. Industrial cutting oils without biocide and with biocide provided sharp contrasts, indicative of the superior performance of the bioresistant surfactants of the invention. The results are illustrated in FIG. 3. This shows the unusual bioresistance of MIDS, a property achieved without biocides. However, after several weeks to several months at $10^4$ (or less), microbe concentration in MIDS emulsion rose again. Lysed cells from the many previous inoculations likely provided nutrients for this regrowth.

MIDS's bioresistant properties were demonstrated in a field test run in the Mobil Technical Center (Princeton, N.J.) machine shop. After cleaning a Do-All band saw, its cutting oil sump (an open-top 5 gallon bucket) was filled with a 5% MIDS emulsion. Weekly, the bacterial and fungi levels were monitored and water added to make up evaporative losses. Occasionally more concentrate was added to make up drag-out losses. In more than 4 months of continuous operation no spoilage was detected.

3) Environmental Testing

Aquatic tests using rainbow trout showed that the aqueous phase from a broken MIDS emulsion was non-toxic to trout. The $LC_{50}$ of the aqueous phase was greater than 10,100 ppm. The fact that the aqueous phase from a broken MIDS emulsion is non-toxic to trout represents a substantial improvement in the art of cutting fluid formulation. Low toxicity means that the aqueous phase from the broken emulsion products of the instant invention can be discharged to the waterways without incurring the high costs associated with the removal or deactivation of biocides that are typically included in the formulation of prior art cutting fluids. The elimination of specific biocides in the bioresistant cutting fluid formulations of the invention provides a product that is essentially environmentally benign compared to cutting fluids of the prior art.

4) Machining Tests

MIDS was tested using drill life and turning (lathe) tests. For comparison, testing included commercial standards cutting fluid emulsions. In drill life tests on moderately hard 4340 steel (321 Brinell Hardness), MIDS proved slightly better than commercial cutting fluids. In turning tests on 4340 steel (229 Brinell Hardness), MIDS performed as well as the commercial cutting fluids. In drill life tests on 390 aluminum (a high silicon aluminum used by the automobile industry), MIDS was superior to commercial fluids. In drill life tests on 316 stainless steel MIDS was superior to cutting fluids that did not contain chlorinated wax.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for increasing the resistance to biological degradation of a cutting fluid emulsion made from a bioresistant cutting fluid concentrate and water comprising:

preparing the bioresistant cutting fluid concentrate by treating a lubricative basestock material with an amount sufficient to impart bioresistant properties to the cutting fluid concentrate of a bioresistant surfactant composition comprising succinic acid, or derivatives thereof, containing at least one branched aliphatic substituent group, derived from a propylene oligomer, on the alpha carbon of the succinic acid, the substituent containing at least nine carbon atoms, at least three of which are tertiary carbon atoms; and blending the bioresistant cutting fluid concentrate with water, in the absence of a biocide, to produce a bioresistant emulsion.

2. The method of claim 1 in which the propylene oligomer contains 9 to 150 carbon atoms.

3. The method of claim 1 in which the substituent has the recurring structure comprising ($-CH_2-CRH-$)n, wherein R comprises methyl and n is an integer from 3 to 50.

4. The method of claim 1 in which the emulsion comprises water and the bioresistant surfactant in a volumetric ratio of concentrate to water of between about 0.5 to 100 and about 10 to 100.

5. The method of claim 1 in which the emulsion further comprises at least one exogenous oil and the surfactant facilitates rejection of the exogenous oil from the emulsion.

6. The method of claim 1 in which the oligomer comprises a propenyl tetramer.

7. The method of claim 1 in which the derivatives of succinic acid is a mono or dialkali or alkaline earth salts, ammonia or amine salts, mono or diester, mono or diamide, succinimide or bis-succinimide.

8. The method of claim 1 in which a derivative of succinic acid is monoisobutyl-2-dodecenyl potassium succinate.

9. The method of claim 7 in which the mono or diester includes poly(ethoxy)ethyl ester or poly(isopropoxy)isopropyl ester.

10. The method of claim 1 in which the lubricative basestock material is selected from the group consisting of a polymer or copolymer of ethylene, propylene, butene, isobutene, isoprene or other alpha-olefin.

11. The method of claim 1 in which the basestock material is polypropene, polydecene or mineral oil.

12. In an aqueous cutting fluid comprising water, an oil component and a surfactant component for maintaining the oil in the form of an emulsion, wherein the improvement comprises use as a bioresistant surfactant of succinic acid or derivative thereof containing a branched aliphatic substituent group, derived from a propylene oligomer, on the alpha carbon of the succinic acid, said substituent containing at least nine carbon atoms, at least three of which are tertiary carbon atoms.

13. The aqueous cutting fluid as claimed in claim 12 in which the propylene pligomer contains between 9 and 150 carbon atoms.

14. The aqueous cutting fluid as claimed in claim 12 in which the propylene oligomer comprises a propenyl tetramer.

15. The aqueous cutting fluid as claimed in claim 12 in which the derivative of succinic acid is selected from the group consisting of a mono or dialkali or alkaline earth salt, ammonia or amine salt, mono or diester, mono or diamide, succinimide or bis-succinimide.

16. The aqueous cutting fluid as claimed in claim 12 in which the derivative of succinic acid is monoisobutyl-2-dodecenyl succinate.

17. The aqueous cutting fluid as claimed in claim 12 in which the derivative of succinic acid is mono-(N,N-diethylethanolamine)-2-dodecenyl-succinate N,N-diethylethanolammonium salt.

18. The aqueous cutting fluid as claimed in claim 12 in which the derivative of succinic acid is mono-triethanolamine-2-dodecenyl-succinate.

19. The aqueous cutting fluid as claimed in claim 12 in which the derivative of succinic acid is mono-N,N-diethyl-2-dodecenyl-succinamide.

20. The aqueous cutting fluid as claimed in claim 12 in which the oil component is selected from the group consisting of a polymer or copolymer of ethylene, propylene, butene, isobutene, isoprene or other alpha-olefin or a mineral oil.

21. The aqueous cutting fluid as claimed in claim 12 which further comprises an effective amount of an extreme-pressure active material.

22. The aqueous cutting fluid as claimed in claim 12 which further comprises an effective amount of a corrosion inhibitor.

23. The aqueous cutting fluid as claimed in claim 12 which further comprises an effective amount of a defoamant.

24. The aqueous cutting fluid as claimed in claim 12 which further comprises an effective amount of a metal cleaner.

25. The aqueous cutting fluid as claimed in claim 12 which further comprises an effective amount of a friction reducer.

26. An aqueous cutting fluid comprising water, an oil component and a bioresistant surfactant component for maintaining the oil in the form of an emulsion, the surfactant component is monoisobutyl-2-dodecenyl succinate.

* * * * *